United States Patent [19]

Sampson

[11] Patent Number: 4,874,206

[45] Date of Patent: Oct. 17, 1989

[54] TIRE WHEEL AND WHEEL COVER SPRAY SHIELD AND KIT

[76] Inventor: Thomas J. Sampson, 10514 Aqueduct Ave., Granada Hills, Calif. 91344

[21] Appl. No.: 129,232

[22] Filed: Dec. 7, 1987

[51] Int. Cl.4 .......................... B05C 11/16; B60B 7/00
[52] U.S. Cl. .................................. 301/37 R; 118/505; 301/37 PB
[58] Field of Search ............ 301/37 R, 37 ST, 37 TC, 301/37 P, 37 H, 37 T, 37 TP, 37 PB, 37 B, 108 R, 108 A; 150/52 K, 54 R, 54 A, 54 B; 118/504, 505

[56] References Cited

U.S. PATENT DOCUMENTS

| | | | |
|---|---|---|---|
| 2,386,240 | 10/1945 | Lyon | 301/37 R |
| 2,580,543 | 1/1952 | Henderson | 301/37 R |
| 2,627,839 | 2/1953 | Hudgins et al. | 118/505 |
| 3,001,509 | 9/1961 | Carpenter et al. | 118/505 |
| 3,007,401 | 11/1961 | Kordenbrock | 118/505 X |
| 3,854,448 | 12/1974 | Kromanaker | 118/505 |
| 4,027,919 | 6/1977 | Foster et al. | 301/37 R |
| 4,133,583 | 1/1979 | Spisak | 301/37 TP |
| 4,235,476 | 11/1980 | Arvidson | 301/108 R |
| 4,241,954 | 12/1980 | Brown | 301/37 R |
| 4,344,654 | 8/1982 | Apezynski | 301/37 P X |
| 4,399,347 | 8/1983 | Schmitt | 296/95 C X |

FOREIGN PATENT DOCUMENTS

| | | | |
|---|---|---|---|
| 500479 | 1/1951 | Belgium | 301/108 R |
| 1455698 | 5/1964 | Fed. Rep. of Germany | 150/54 B |
| 2569619 | 3/1986 | France | 301/37 P |

Primary Examiner—Robert B. Reeves
Assistant Examiner—Russell D. Stormer
Attorney, Agent, or Firm—John J. Posta, Jr.

[57] ABSTRACT

The mag tire wheel and wheel cover shield includes a generally cylindrical preferable flat flexible resilient disc of paper, plastic, metal or the like, designed to cover the outer face of a "mag" tire wheel or wheel cover so that the tire can be sprayed with a polish or coating without spraying the wheel cover or mag wheel. The disc has a handle on the outer surface thereof, either protruding therefrom or indented, to place and help hold the disc against the "mag" wheel or wheel cover. A hook-type peripheral rim projecting inwardly from the inner face of the disc allows it to be releasably hooked in place around the wheel cover rim or mag wheel rim. Alternatively a ring or strip of adhesive or spaced magnets, or one or more suction cups strategically placed may be used to hold the disc against the wheel cover or mag wheel. A hard shield may extend outwardly from the disc handle to protect the user's hand against spraying. An outer coating of polytetrafluorethylene or other smooth or slippery plastic protects the disc from the spray and provides a wipeable surface. In one embodiment the disc may have a plurality of concentric, peripheral, removable scored rings, each with its hooked outer rim, so that the diameter of the disc can be varied to match various diameters of wheel covers and "mag" wheels. In another embodiment, a kit is provided, including the disc and a number of snap-on rings of various diameters for the same purpose. The shield and kit are efficient, durable and inexpensive.

5 Claims, 2 Drawing Sheets

TIRE WHEEL AND WHEEL COVER SPRAY SHIELD AND KIT

BACKGROUND OF THE INVENTION

1. Field of the Invention

The present invention generally relates to protective means and, more particularly, to an improved tire wheel and wheel cover spray shield.

2. Prior Art

Automobile and other vehicle tires are generally mounted on strong steel wheels of poor cosmetic appearance. It is customary to mount attractive chromed or aluminum wheel covers thereover, or to substitute so-called "mag" wheels for the steel wheels. The "mag" wheels are of attractive appearance and do not require the use of cosmetic wheel covers.

In order to dress up a motor vehicle further, certain motorists spray their rubber vehicle tires with a protective shiny finish or coating which, unfortunately, leaves an undesired deposit on the "mag" wheels themselves and on the attractive wheel covers.

Accordingly, there is a need for a protective removable shield which will prevent "mag" wheels and wheel covers from being sprayed undesireably when the rubber tires mounted therewith are being sprayed with a protective shiny coating. Such shield preferably should be easily put into place and held in place and as easily removed, and should preferably be available in various diameters to fit various sizes of "mag" wheels and wheel covers.

SUMMARY OF THE INVENTION

The improved tire wheel and cover spray shield and kit of the present invention satisfy all the foregoing needs. The shield and kit are substantially as set forth in the Abstract.

Thus, the shield comprises a circular flat or slightly cupped disc with a handle attached to or integral with the outer surface thereof. The disc bears means for releasably securing to a "mag" wheel rim or to a tire wheel cover to protect it when the tire mounted on the wheel is sprayed with a coating such as that sold under the trademark Armor-All to enhance the appearance of the tire and protect its surface. Such a coating is undesireable on the "mag" wheel and wheel cover, marring the shiny decorative outer surfaces thereof. The shield prevents the spray from reaching those surfaces.

The shield may be provided with a slippery outer surface from which to easily wipe such spray so that the shield can be reused. The shield may also have a hand spray shield around the handle to prevent the user's hand and arm from being sprayed when applying the tire coating.

The shield may be adjustable in diameter, either by having a unitary body with scored concentric break-off rings, or by providing a kit with the shield disc and a number of snap-on rings different diameters for releasable connection to the outer perimeter of the disc.

The means of releasably attaching the shield to the wheel cover or "mag" wheel may be a peripheral hooked rim, or a peripheral adhesive strip or one or a series of peripheral magnets or one or more suction cups extending inwardly from the inner face of the shield. Further features of the present invention are set forth in the following detailed description and accompanying drawings.

DRAWINGS

DETAILED DESCRIPTION

FIGURES 1, 2 & 5.

Figure 1:
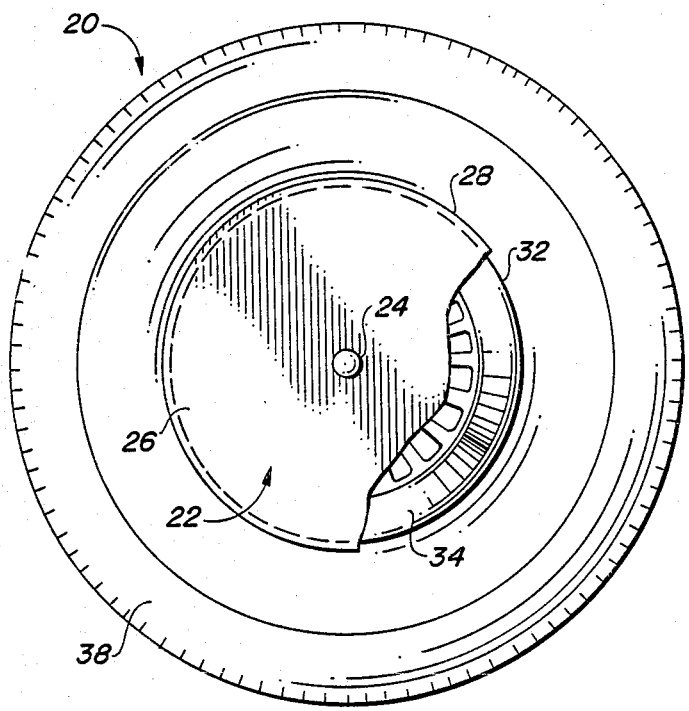
FIG. 1 is a schematic front elevation, partly broken away, of a first preferred embodiment of the improved shield of the present invention releasably connected to the outer face of a tire wheel cover.
Figure 2:
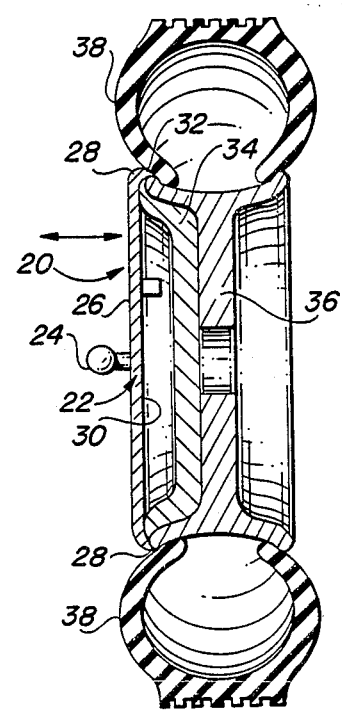
FIG. 2 is a schematic cross-section of the shield of FIG. 1 in place over the cover and tire wheel of FIG. 1.
Figure 5:
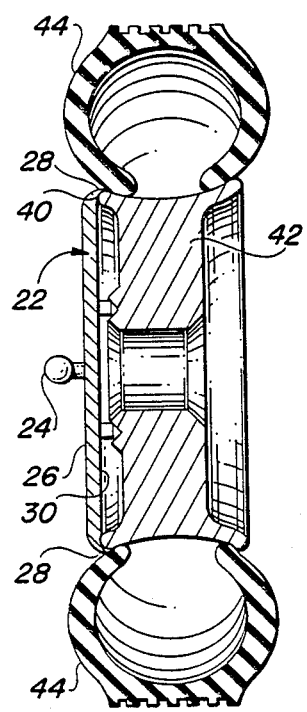
FIG. 5 is a schematic cross-section of the shield of FIG. 1 releasably connected to the outer face of a "mag" wheel.
Figure 6:
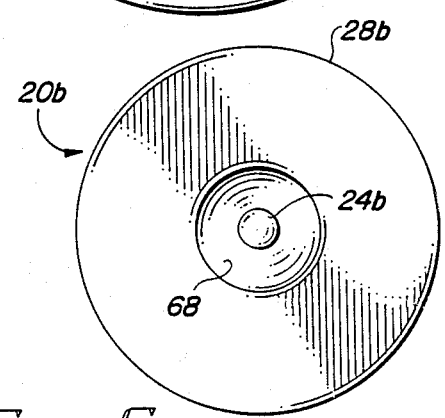
FIG. 6 is a schematic front elevation of a third preferred embodiment of the improved shield of the present invention.

A first preferred embodiment of the improved shield of the present invention is schematically depicted in FIGS. 1, 2 & 5. As shown in FIG. 1, shield 20 comprises a circular disc 22 which is flat (FIGS. 2 & 5) and which includes an integral or attached handle 24 projecting outwardly from the outer surface 26 thereof.

The disc may be of paper, paperboard, cardboard, plastic, rubber, metal or the like and preferably is slightly flexible and resilient. It includes a peripheral hooked rim 28 projecting inwardly from the inner surface 30 of disc 22 for releasable engagement with either the outer rim 32 of a decorative wheel cover 34 disposed over a tire wheel 36 bearing a tire 38 (FIGS. 1 & 2), or the outer rim 40 of a decorative "mag" wheel 42 (FIG. 5) bearing tire 44. In either case, shield fully protects wheel cover 34 or "mag" wheel 42 from spray directed against tire 38 or tire 44 to coat it for improved decorative appearance.

Handle 24 is used to place shield 20 in position and there is enough flex in disc 22 and/or rim 28 to allow a snap-on releasable fit of shield 20 over the rim of cover 34 or "mag" wheel 42, as desired. When the tire spraying is completed, shield 20 is pulled off of cover 34 or wheel 42 and stored for reuse. Hook-bearing rim 28 of disc 22 can be of resilient rubber, plastic, or springy metal, if desired, to facilitate the snap fit. Accordingly, shield 20 is simple, inexpensive, durable and efficient.

FIGS. 3 & 4.

Figure 3:
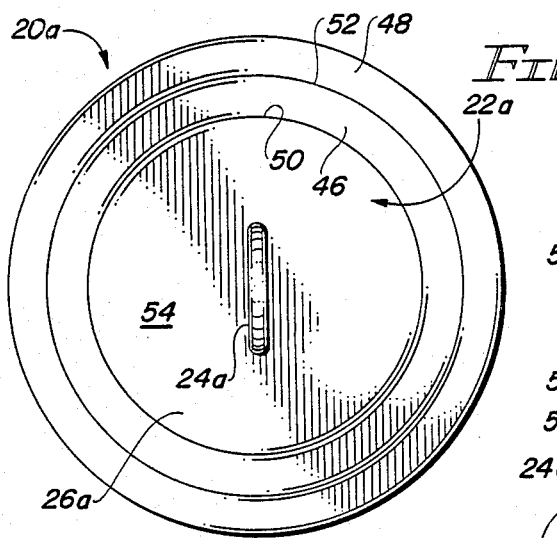
FIG. 3 is a schematic front elevation of a second preferred embodiment of the improved shield of the present invention.
Figure 4:
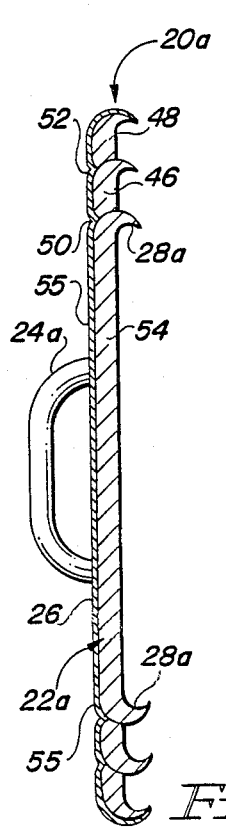
FIG. 4 is a schematic cross-section of the shield of FIG. 3.

A second preferred embodiment of the improved shield of the present invention is schematically depicted in FIGS. 3 & 4. Thus, shield 20a is shown. Components thereof similar to those of shield 20 bear the same numerals, but are succeeded by the letter "a". Shield 20a is identical to shield 20, except as follows:

(a) disc 22a is provided with two concentric peripheral rings 46 and 48 defined by score lines 50 and 52, respectively, around core 54 which bears raised handle 24a; and (b) other surface 26a of disc 22a is coated with a layer 55 of slippery tetrafluoroethylene or the like material from which a tire coating spray can be easily wiped.

Core 54 has peripheral hooked rim 28a while ring 46 has peripheral hooked rim 56 and ring 48 has peripheral hooked rim 58. The diameter of shield 20a can be controlled by not breaking away either ring 46 or 48 or by breaking off just ring 48 or by breaking off both of rings 46 & 48, in order to match the diameter of shield 20a to the diameter of the wheel cover or "mag" wheel (not shown) to which shield 20a is to be releasably connected. Shield 20a can be made of materials similar to shield 20 and has the other advantages of shield 20.

FIGS. 6, 7, 8 & 9.

A third preferred embodiment of the present invention is schematically depicted in FIGS. 6–9. Components thereof similar to those of shield 20 or 20a bear the same numerals, but are succeeded by the letter "b".

Figure 7:
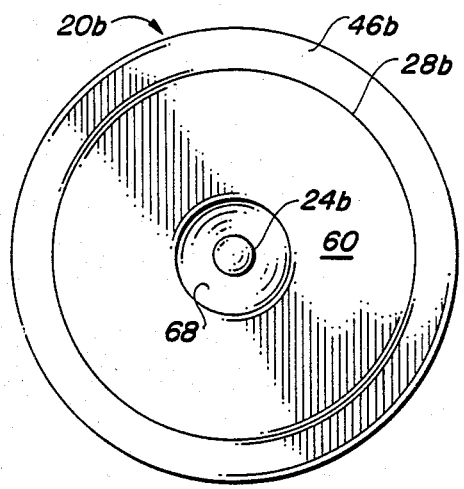
FIG. 7 is a schematic front elevation of the shield of FIG. 6 with a narrow peripheral ring releasably connected thereto.
Figure 8:
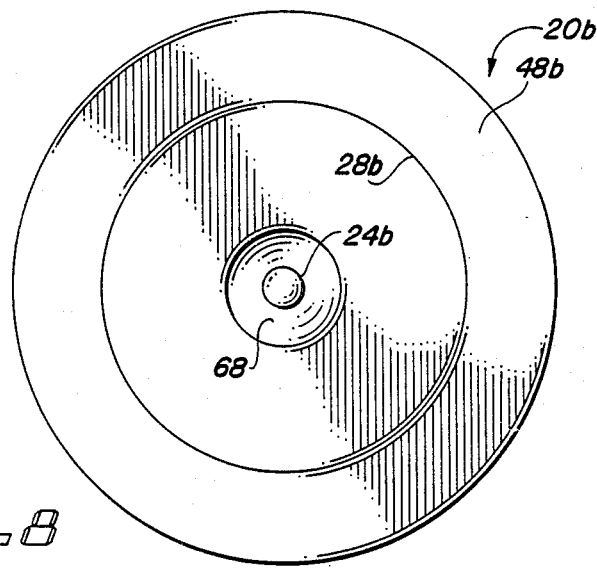
FIG. 8 is a schematic front elevation of the shield of FIG. 6 with a wider peripheral ring releasably connected thereto.
Figure 9:
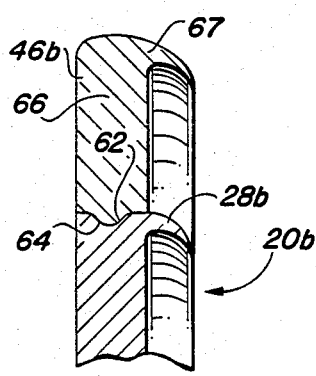
FIG. 9 is an enlarged schematic fragmentary cross-section of the ring and shield of FIG. 7, showing the manner of their interconnection.

Thus, a kit 60 is shown, which comprises the shield 20b of FIGS. 6–9, along with the two rings 46b and 48b of FIGS. 7 & 8, respectively. Ring 48b is wider than ring 46b. Rings 46b and 48b are initially separate from shield 20b in kit 60 but either one may be releasably secured to hooked rim 28b as shown in FIGS. 7, 8 and 9. Thus, in FIG. 9 ring 46b is depicted releasably secured to rim 28b of shield 20b. In this regard, rim 28b may be provided with a V-shaped groove 62 which cooperates with a mating V-shaped projection 64 on the inner rim 66 of ring 46b to releasably hold ring 46b on the outer perimeter of shield 20b. In this regard, rings 46b and 48b and/or shield 20b are resilient and flexible to permit the desired releasable snap-on fit of ring 46b or 48b on on shield 20b, in order to control the diameter of shield 20b so as to fit a desired "mag" wheel or wheel cover (not shown). Ring 46b has a hooked outer rim 67 similar to rim 28b. Ring 48b is constructed similarly to ring 46b in all respects except ring diameter.

It will be noted that handle 24b is recessed and provided with a surrounding recessed finger grip area 68. Kit 60 and shield 20b with or without ring 46b or 48b, have the advantages of shield 20a.

FIGS. 10 & 11

Figure 11:
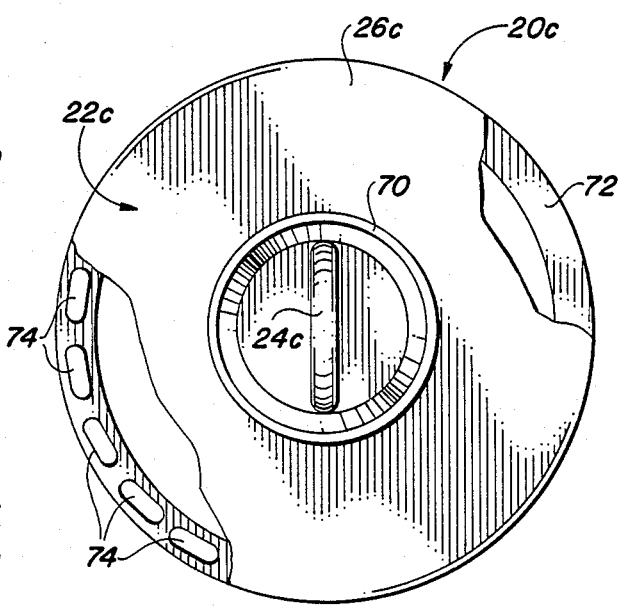
FIG. 11 is a schematic front elevation, partly broken away, of the shield of FIG. 10; and, FIG. 12 is a schematic cross-section of a fifth preferred embodiment of the shield of the present invention.
Figure 10:
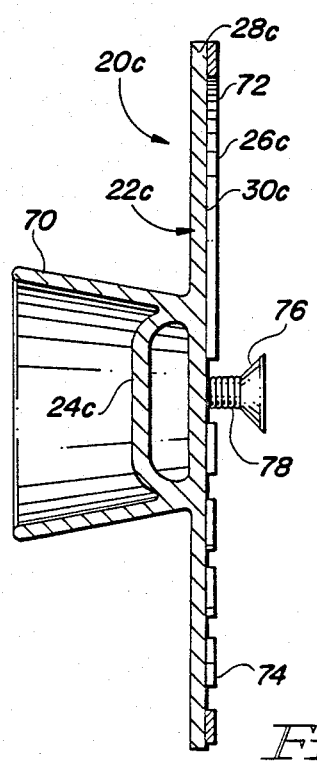
FIG. 10 is a schematic cross-section of a fourth preferred embodiment of the shield of the present invention.

A fourth preferred embodiment of the improved shield of the present invention is schematically depicted in FIGS. 10 and 11. Thus, shield 20c is shown. Components thereof similar to those of any shields 20, 20a, & 20b bear the same numerals, but are succeeded by the letter "c". Shield 20c is substantially identical to shield 20 except as follows:

(a) handle 24c is surrounded by a hollow frusto-conical open-ended hand and wrist spray shield 70 connected to or integral with outer surface 26c of disc 22c;

(b) instead of hooked rim 28 as the releasable connecting means, rim 28c is hookless but bears instead a semi-circular strip of adhesive tape 72 and a semi-circular line of spaced magnets 74, and there is also provided a suction cup 76 mounted on a collapsible coiled spring 78 projecting inwardly from the central portion of the inner surface 30c of disc 22c. Shield 20c has the advantages of shield 20.

FIG. 12.

Figure 12:
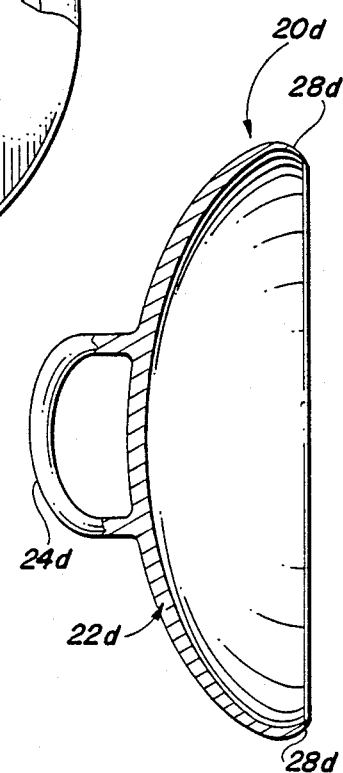

A fifth preferred embodiment of the improved shield of the present invention is schematically depicted in FIG. 12. Thus, shield 20d is shown. Components thereof similar to those of any of shields 20, 20a, 20b and 20c bear the same numerals, but are succeeded by the letter "d". Shield 20d is identical to shield 20 except as follows:

(a) handle 24d is similar to handle 24c; and, (b) disc 22d is slightly cup shaped and very flexible and resilient to facilitate anchoring of rim 28d to a wheel cover or "mag" wheel (not shown). Shield 20d has the advantages of shield 20.

Various other modifications, changes, alterations and additions can be made in the improved kit and shield of the present invention, their components and parameters. All such modifications, changes, alterations and additions as are within the scope of the appended claims form part of the present invention.

What is claimed is:

1. An improved removable tire wheel and wheel cover spray shield, said shield comprising, in combination:

(a) a generally cylindrical disc;

(b) a handle connected to the outer face of said disc;

(c) securing means connected to the inner face of said disc for releasably securing said disc over the outer face of a tire wheel or wheel cover to protect the same during spraying of a tire bearing the same, and (d) wherein said disc includes shield disposed around said handle to protect a user's hand during tire spraying and an outer wipeable coating disposed on said disc from which to remove tire spray.

2. An improved removable tire wheel and wheel cover spray shield, said shield comprising, in combination:

(a) a generally cylindrical disc;

(b) a handle connected to the outer face of said disc;

(c) securing means connected to the inner face of said disc for releasably securing said disc over the outer face of a tire wheel or wheel cover to protect the same during spraying of a tire bearing the same, (d) wherein said disc is generally flat and said securing means comprises an annular wheel and sheel cover rim-gripping hook projecting inwardly from said inner disc face, and (e) wherein said disc includes a plurality of peripheral concentric circular score lines dividing the periphery of said disc into a plurality of concentric rings, and a plurality of concentric peripheral hooks on the inner face of said disc at the level of said score lines, whereby the diameter of said disc can be decreased by breaking away one or more of said rings from the remainder of said disc.

3. An improved removable tire wheel cover spray shield kit, said kit comprising, in combination:

(a) a generally cylindrical resilient flexible disc;

(b) a handle connected to the outer face of said disc;

(c) securing means connected to the inner face of said disc for releasably securing said disc over the outer face of a "mag" tire wheel or a wheel cover to protect the same during spraying of a tire bearing the same; and, (d) a plurality of flexible resilient rings of different diameters larger than the diameter of said disc, each said ring being adapted to releasably grip the outer perimeter of said disc to increase the effective diameter thereof and bearing "mag" wheel and wheel cover-gripping means.

4. The improved kit of claim 3 wherein said rings are adapted to snap on said disc perimeter.

5. The improved kit of claim 4 wherein the inner perimeter of said ring and the outer perimeter of said disc bearing mating clamping means to effect said snap on and wherein each said ring bears an annular "mag" wheel or wheel cover-engaging hook on the outer perimeter thereof.

* * * * *